(12) United States Patent
Allen

(10) Patent No.: US 8,453,327 B2
(45) Date of Patent: Jun. 4, 2013

(54) SPRAYED SKIN TURBINE COMPONENT

(75) Inventor: David B. Allen, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 574 days.

(21) Appl. No.: 12/701,025

(22) Filed: Feb. 5, 2010

(65) Prior Publication Data
US 2011/0192024 A1 Aug. 11, 2011

(51) Int. Cl.
B21D 53/78 (2006.01)
(52) U.S. Cl.
USPC .......... 29/889.721; 29/889.722; 228/125; 228/136; 228/161; 228/165; 228/173.1
(58) Field of Classification Search
USPC .......... 29/889.721, 889.722; 228/125, 136, 228/161, 164, 165, 173.1, 174
See application file for complete search history.

(56) References Cited

U.S. PATENT DOCUMENTS

| 3,806,276 | A | 4/1974 | Aspinwall |
| 5,328,331 | A | 7/1994 | Bunker et al. |
| 5,419,971 | A | 5/1995 | Skelly et al. |
| 5,484,258 | A | 1/1996 | Isburgh et al. |
| 5,640,767 | A | 6/1997 | Jackson et al. |
| 5,875,549 | A | 3/1999 | McKinley |
| 6,060,174 | A | 5/2000 | Sabol et al. |
| 6,074,706 | A * | 6/2000 | Beverley et al. ............ 427/454 |
| 6,508,000 | B2 | 1/2003 | Burke et al. |
| 6,514,046 | B1 | 2/2003 | Morrison et al. |
| 6,709,230 | B2 | 3/2004 | Morrison et al. |
| 6,805,535 | B2 | 10/2004 | Tiemann |
| 7,182,580 | B2 | 2/2007 | Bostanjoglo et al. |
| 7,182,581 | B2 | 2/2007 | Bostanjoglo et al. |
| 7,247,002 | B2 | 7/2007 | Albrecht et al. |
| 2008/0160269 | A1 | 7/2008 | Stamm |
| 2008/0298975 | A1 | 12/2008 | James et al. |

* cited by examiner

Primary Examiner — Peter DungBa Vo
Assistant Examiner — Azm Parvez

(57) ABSTRACT

Fabricating a turbine component (50) by casting a core structure (30), forming an array of pits (24) in an outer surface (32) of the core structure, depositing a transient liquid phase (TLP) material (40) on the outer surface of the core structure, the TLP containing a melting-point depressant, depositing a skin (42) on the outer surface of the core structure over the TLP material, and heating the assembly, thus forming both a diffusion bond and a mechanical interlock between the skin and the core structure. The heating diffuses the melting-point depressant away from the interface. Subsurface cooling channels (35) may be formed by forming grooves (34) in the outer surface of the core structure, filling the grooves with a fugitive filler (36), depositing and bonding the skin (42), then removing the fugitive material.

14 Claims, 5 Drawing Sheets

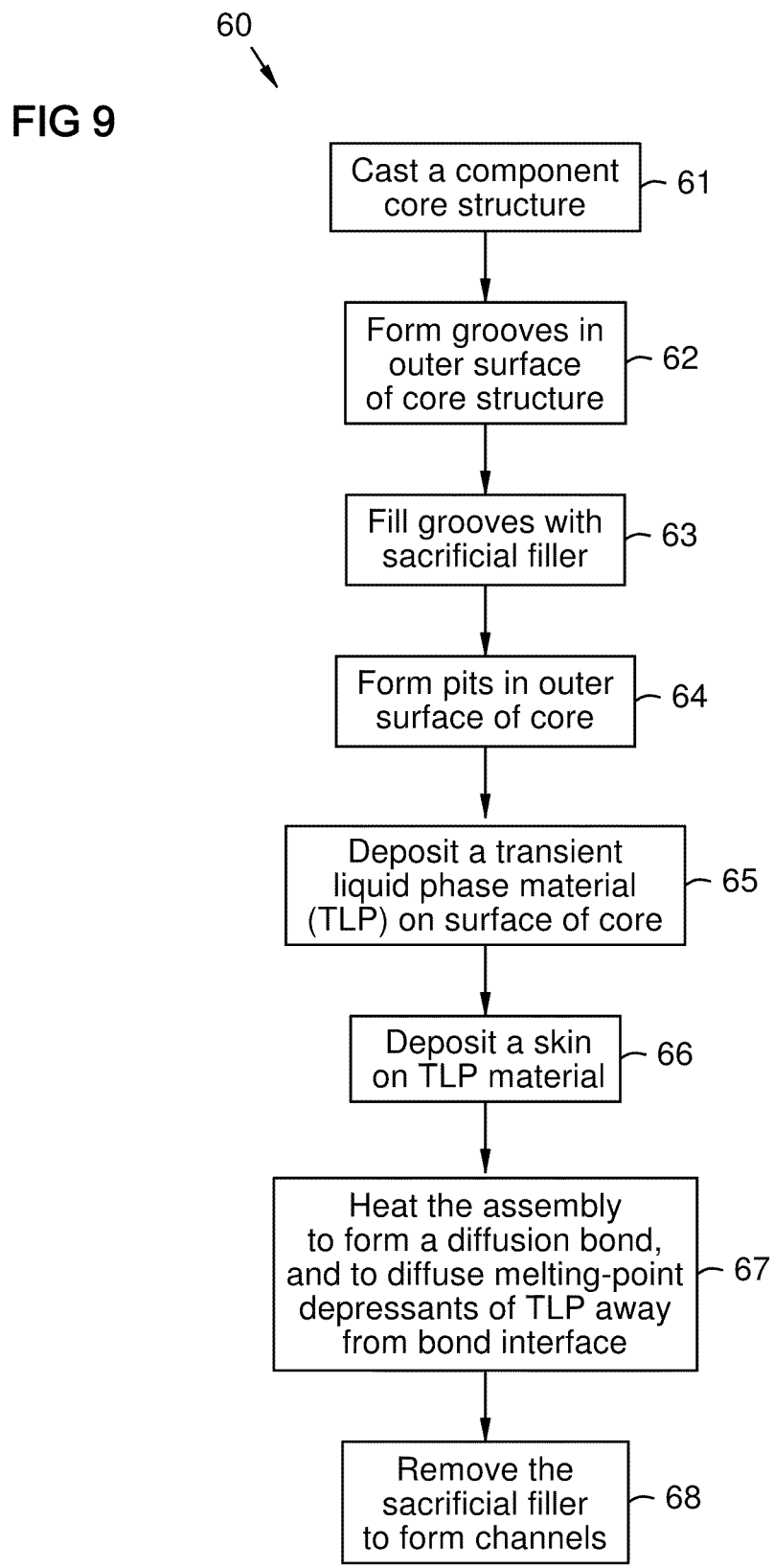

SPRAYED SKIN TURBINE COMPONENT

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

This invention relates to fabrication of turbine engine components by forming a metal skin over a core structure with a mechanically interlocking skin/core interface. It particularly relates to fabrication of turbine blades and vanes with subsurface cooling channels.

BACKGROUND OF THE INVENTION

Components in the hot gas path of gas turbines, such as rotating blades and stationary vanes, have been produced by metal casting. Cooling passages can be formed in the component by placing pre-formed inserts in the mold. Such inserts are typically made from oxide ceramics. A high-temperature material such as ceramic is required to withstand the molten metal temperatures during pouring. After solidification of the casting the inserts are removed. This can be done for example by dissolving them with a caustic solution. However, ceramics are brittle. If an insert is too thin it can break during pouring or solidification of the metal, resulting in a defective component. This is especially true of directionally solidified (DS) and single crystal (SX) cast components, in which the mold is withdrawn slowly from the furnace during solidification, which increases the amount of tine that the insert is exposed to the molten metal.

Pre-formed ceramic inserts are expensive, and are limited as to the size and complexity of cooling passages that can be produced. Small passages or tortuous circuits would require inserts that are thin, and therefore delicate. In some turbine airfoils and other components it is desirable to provide numerous small cooling channels just below the component surface. One approach is first to cast an airfoil core structure of a superalloy. Grooves are then formed in the outer surface of the core, either during casting or by machining. A superalloy skin is formed separately and bonded to the core, covering the grooves to form sub-surface cooling passages. Transient liquid phase (TLP) bonding has been used for this, in which a foil, powder, or tape, made of a low melting point variant of the airfoil core material is placed between the skin and the core. Upon heating, the TLP partially melts, fusing the skin to the core. This process can use a smaller gap and a higher temperature than soldering or brazing. The TLP material contains melting point depressants such as silicon and/or boron. However, the size of skin that can be accurately formed and bonded has been a limitation of this process.

The assignee of the present invention has invented a process for forming the skin in place on the metallic core, as described in U.S. Pat. No. 5,875,549. Grooves may be formed in the surface of the core. A fugitive filler material such as a ceramic paste is placed in the grooves. The fugitive material is smoothed flush with the core surface, and then a skin of metal is deposited on the surface of the core and the fugitive material. The skin bonds to the core surface between the grooves. The fugitive material is removed, leaving subsurface cooling channels.

However, even with a diffusion bonding heat treatment, the bond interface between the skin and core is weaker than the material of the skin or the core because no grain growth occurs across the bond line. A stronger bond interface is desired.

BRIEF DESCRIPTION OF THE DRAWINGS

The invention is explained in the following description in view of the drawings that show:

FIG. 9 is a flowchart of a method of the invention.

DETAILED DESCRIPTION OF THE INVENTION

The inventors have devised a method and mechanism for forming a metal skin in place on a cast metal core structure using mechanical interlocks in the skin/core interface that simulate and approximate an interlocking internal grain structure across the bond line.

Figure 1:
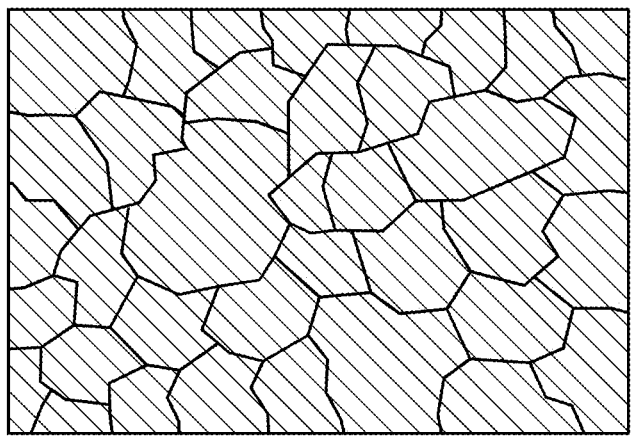
FIG. 1 is a conceptual illustration of a known equiaxed metal grain structure.

FIG. 1 illustrates a known equiaxed grain structure 20 that forms in cast metals under commonly used casting conditions. Herein, equiaxed means an internal grain structure with grains of low average aspect ratio, such as less than 3, in random interlocking orientations. This is a desirable internal structure for a bond interface, because it is isotropic, strong, and non-laminar, so it resists separation.

Figure 2:
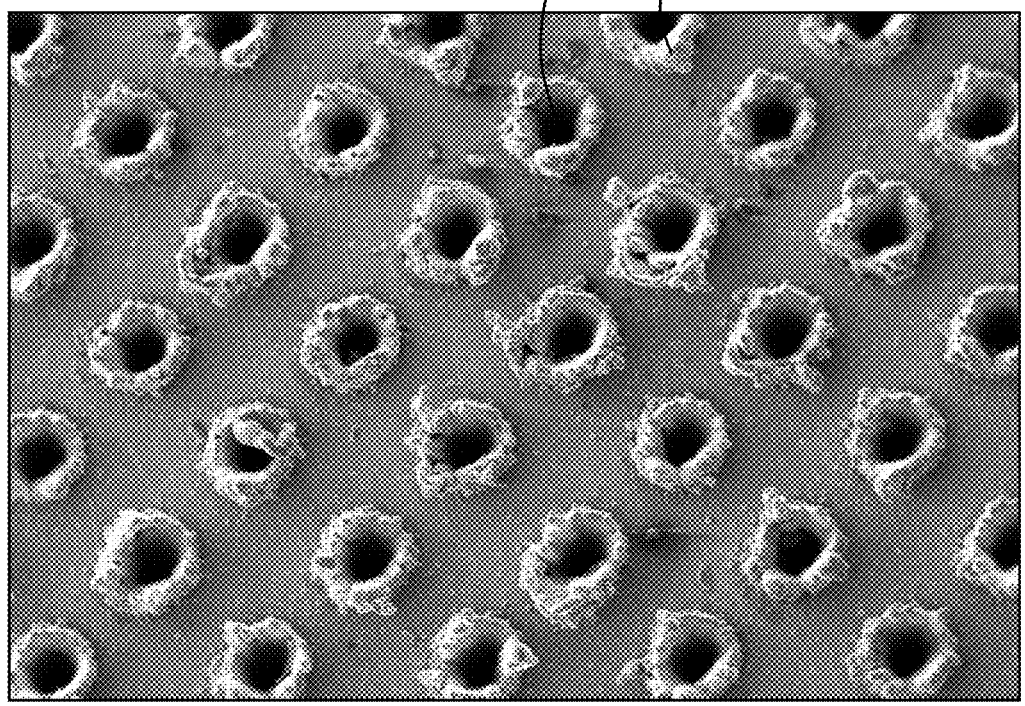
FIG. 2 is a photo micrograph of a pitted surface according to the invention.

FIG. 2 shows a surface portion 22 of a CM247 superalloy substrate before a skin is applied. Pits 24 are formed in the surface by laser drilling to provide a mechanically interlocking feature for a subsequently applied thermally sprayed skin, as explained in more detail below. Ejecta rings 26 may form around the pits depending on the laser parameters. In one embodiment, the inventors do not remove these rings, because they extend into the subsequently applied skin, increasing the bond surface area, and increasing the mechanical interlock. The pits 24 may be formed in an array that simulates and approximates an equiaxed grain structure in size and geometry. For example, the pits may have an average diameter of 20-100 microns, and an average separation distance, on at least a given portion of the component surface, of 1 to 5 times the average pit diameter. They may have an average depth of 1 to 10 times the average pit diameter, or 1.5 to 4 times the average pit diameter in one embodiment. In the sample shown in FIG. 2, the average pit diameter is about 50 microns.

The scale of the pits is significant, because thermally deposited coatings tend to follow the features of the underlying substrate. Larger pits would produce a dimpled outer skin surface, which would be disadvantageous for airfoil applications. Alternately, grooves could be used instead of pits. However, grooves form continuous lines of discontinuity that can seed a crack in the substrate, whereas pits do not form such lines. Also grooves do not block bond shear in the direction of the grooves, whereas pits have 360-degree walls, so they block bond shear in all directions.

Figure 3:
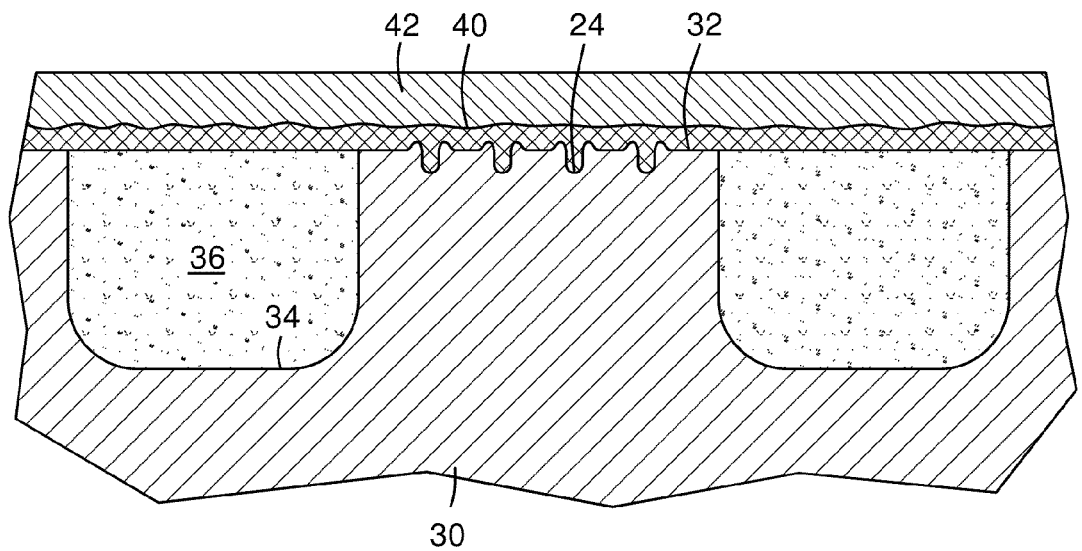
FIG. 3 is a sectional view of a component substrate with grooves filled with fugitive material, and a skin interlocked to the substrate surface with pits.

FIG. 3 is a partial sectional view of a component core structure 30, with an outer surface 32. Grooves 34 in the outer surface have a fugitive filler 36. Pits 24 are formed in the outer surface 32 such as illustrated in FIG. 1. A transient liquid phase (TLP) layer 40 covers the outer surface 32. A skin 42 covers the TLP layer 40. The TLP layer 40 may be applied by thermal spraying or other means. For example, it may be formed in a first pass or early passes of thermally spraying the skin 42. For example, the spray material can be graduated from a higher concentration of melting-point depressant elements (layer 40) to a lower concentration or none (layer 42) in later passes. Graduated material deposition techniques are known in the thermal spraying art. The skin may be the same material as the core structure, which may be for example a superalloy known as CM247 in the art, or the skin may be made of a modified core material or a different material. Bonding may be accomplished by maintaining the structure in a temperature range of 1,080 to 1,150 degrees Celsius for one to four hours.

The skin may be applied to the core by known coating deposition techniques, such as plasma spraying, low-pressure plasma spraying, high velocity oxy-fuel (HVOF) spraying, or cold spraying. Mar M002, CM247, and Haynes 230 powders are commercially available from suppliers of thermal spray powders. Spray parameters similar to those known for bond coats may be used.

For example, a 25 micron thick layer of TLP (using Amdry 775 powder) may be sprayed via HVOF onto the CM247 core. The core is then HVOF-sprayed with a 1 mm thick skin of Haynes 230 (using Ni-517-5 powder). The component may then be maintained at 1080 to 1150 degrees Centigrade for 1-4 hours, resulting in metallic diffusion bonding and migration of the melting-point depressants away from the bond interface, leaving a continuous, heat tolerant interface.

Different processes may be used for the TLP layer and the skin. For example, a thin film deposition process may be used for the TLP, while a thermal spray process may be used for the skin. Herein "thin film deposition process" means a process that deposits one or more layers, with each layer being less than 10 microns thick. This includes processes known as atomic layer deposition, chemical vapor deposition, pulsed laser deposition, plating, cathodic arc deposition, molecular beam epitaxy, and other known deposition processes. By using a thin film deposition process for the TLP layer 40, the pits 24 may be filled without blocking the pit opening with spray particles. But using a thermal spray process for the skin provides layering thick enough to smooth over the relatively small pits to form an aerodynamically smooth outermost surface.

After the skin 42 is formed on the core/filler surfaces, the filler 36 is removed from the grooves, for example by exposure to a caustic solution. Methods of removing the filler material using a caustic solution are known in the investment casting art. These methods include a low or high temperature salt bath of potassium hydroxide or through the use of an autoclave. When the filler is removed from the grooves, the skin and substrate of the core structure 30 remain. This forms subsurface cooling channels 35 just below and adjacent to the skin 42 as later shown.

Figure 4:
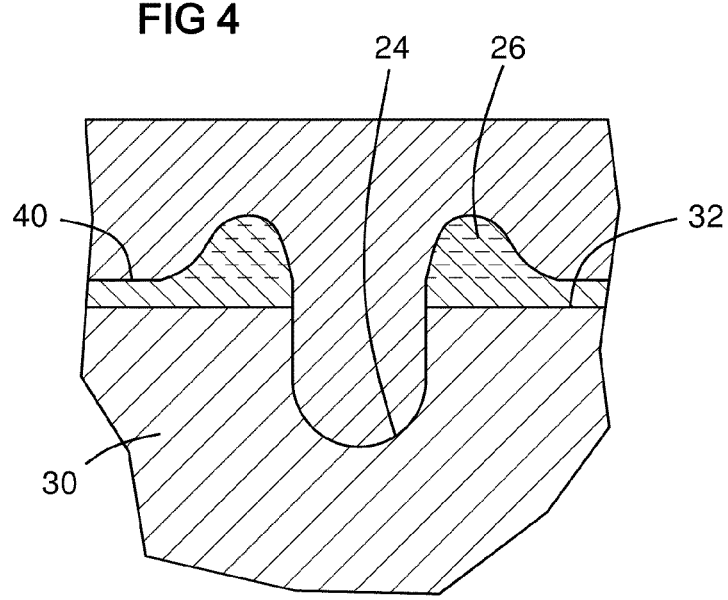
FIG. 4 is a sectional view of a pit formed after depositing a transient liquid phase material.

FIG. 4 illustrates a detail of a pit 24. The pit may be formed by laser drilling, using a narrow laser beam normal to the surface 32. The laser power and duration parameters may be adjusted to produce a desired ejecta ring 26 around the pit 24 as best shown in FIG. 2. In one aspect of the invention the ejecta is not removed, but projects into the skin 42, increasing the bond surface area and interlock. FIG. 4 shows the result of a sequence in which a TLP layer 40 was deposited before the pit was formed. The ejecta ring 26 thus contains some melting-point depressants.

Figure 5:
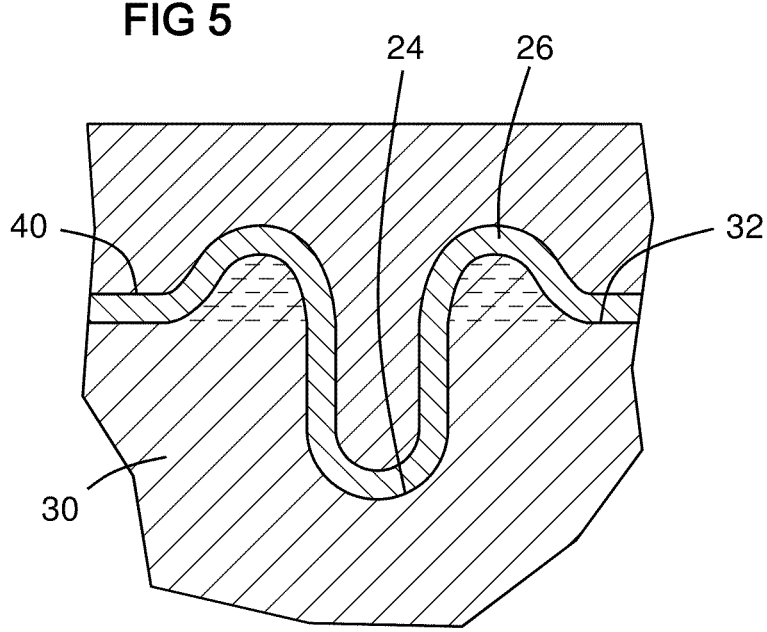
FIG. 5 is a sectional view of a pit formed before depositing a transient liquid phase material.

FIG. 5 shows the result of a processing sequence in which a TLP layer 40 was deposited after the pit 24 was formed. In this case, the TLP layer 40 lines the pit 24. The pit may be drilled larger to accommodate the TLP layer such that the previously described final pit dimensions include the TLP layer.

Figure 6:
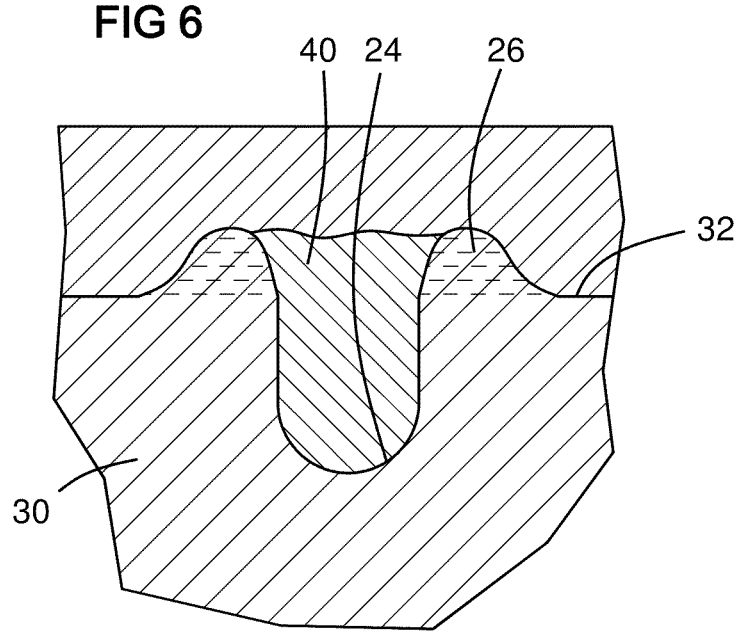
FIG. 6 is a sectional view of a transient liquid phase material deposited only in a pit, and not on the substrate surface in general.

FIG. 6 shows the result of a sequence in which a TLP material 40 was applied as a paste to the surface 32 after the pit 24 was formed, pushed into the pits, then the surface was wiped, leaving the TLP material 40 only in the pits 24. This prevents the TLP material from running into the grooves 34 and partly filling them.

Figure 7:
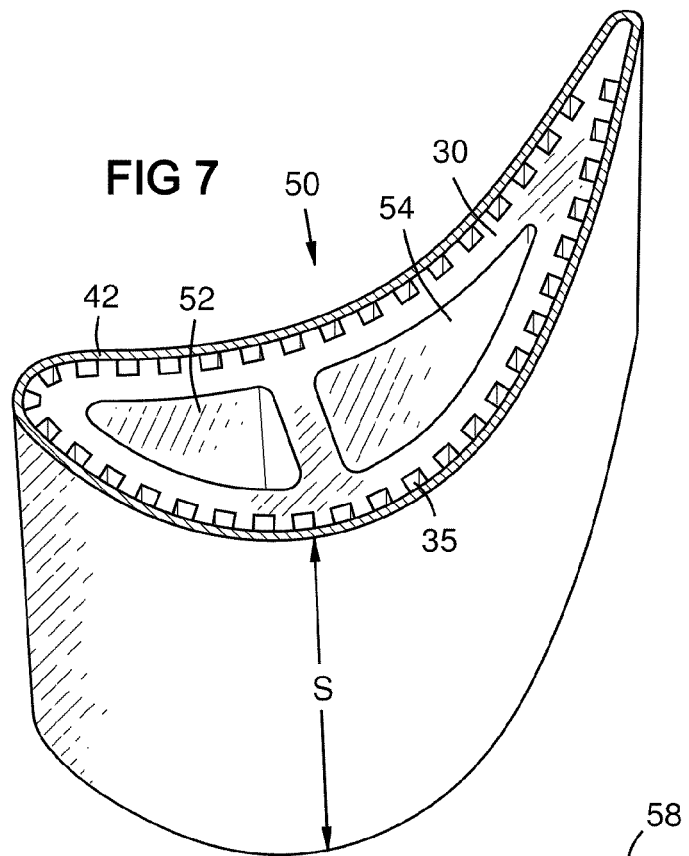
FIG. 7 shows a section on a turbine engine airfoil with subsurface cooling channels formed in a spanwise orientation according to the invention.

FIG. 7 shows an exemplary section of a turbine engine airfoil 50 with central cooling cavities 52, 54, and multiple subsurface cooling channels 35 formed according to one embodiment of the invention. The subsurface cooling channels 35 are oriented spanwise with respect to a span direction S of the airfoil 50.

Figure 8:
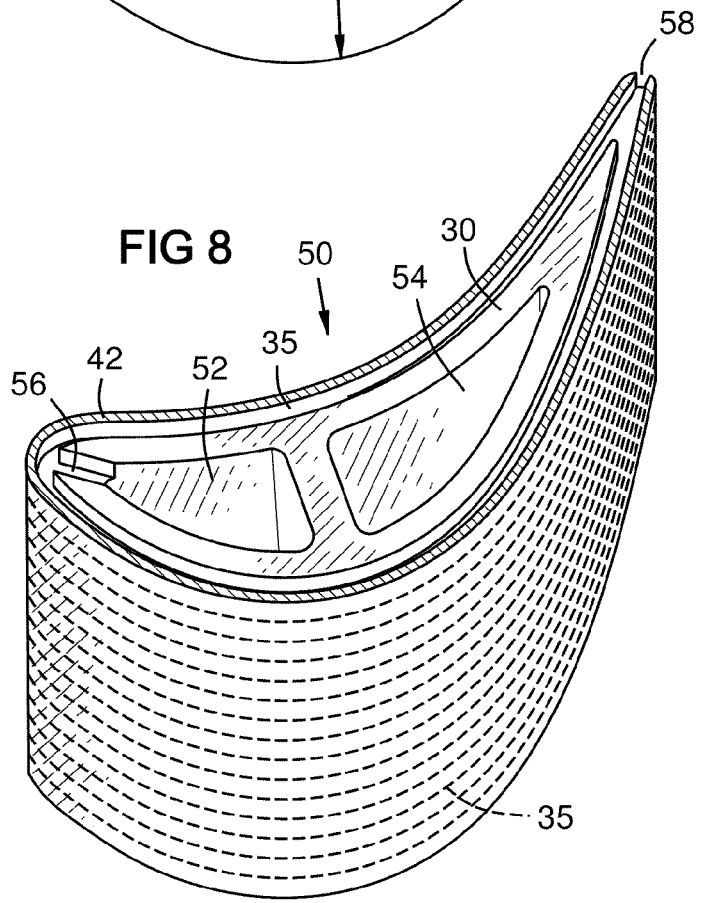
FIG. 8 shows a section on a turbine engine airfoil with subsurface cooling channels formed in a chordwise orientation.

FIG. 8 shows an exemplary section of a turbine engine airfoil 50 with central cooling cavities 52, 54, and multiple subsurface cooling channels 35 formed according to an embodiment of the invention. In this example, the subsurface cooling channels 35 are oriented transversely to a span of the airfoil, as shown by dashed lines. These subsurface cooling channels 35 may be supplied by communication 56 with the front cavity 52 as known. The coolant may exit film cooling holes in the skin 42 (not shown) or at the trailing edge 58 as shown, or by a trailing edge return path, all known. FIGS. 7 and 8 are just examples of applications of the invention, and are not limiting as to the application of the invention or to the orientation of channels.

FIG. 9 is a flowchart of a method 60 of an exemplary embodiment of the invention having the steps of 61—Cast a component core structure;
62—Form grooves in an outer surface of the core structure;
63—Fill the grooves with a sacrificial filler material;
64—Form pits in the outer surface of the core structure;
65—Deposit a transient liquid phase material on the surface of the core structure;
66—Deposit a skin on the surface of the core structure, over the TLP material;
67—Heat the assembly to form a diffusion bond between the skin and the core structure, and to diffuse melting-point depressants of the TLP material away from the bond interface;
68—Remove the sacrificial filler to leave subsurface channels under and adjacent to the skin.

In some embodiments of the invention, the grooves/channels may be omitted and/or a TLP layer may be omitted.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for fabricating a component, comprising:
   forming an array of pits in an outer surface of a core structure;
   forming a skin on the outer surface of the core structure, wherein the skin mechanically interlocks with the pits;
   diffusion bonding the skin to the outer surface of the core structure; and
   forming the pits with an average pit diameter of 20 to 100 microns, an average pit depth of 1.5 to 4 times the average pit diameter, and an average pit separation distance of 1 to 5 times the average pit diameter.

2. The process of claim 1, comprising depositing a transient liquid phase (TLP) material on the outer surface of the core structure prior to thermally spraying the skin onto the outer surface of the core structure over the TLP material.

3. The process of claim 2, wherein the TLP material is deposited using a thin film deposition process that deposits one or more layers of the TLP material, wherein each layer of the TLP material is less than 10 microns thick.

4. The process of claim 2, wherein the TLP material is deposited using a chemical vapor deposition process.

5. The process of claim 2, further comprising, after depositing the skin, maintaining the component in a temperature range of 1,080 to 1,150 degrees Celsius for one to four hours.

6. The process of claim 2, comprising sequentially first depositing the TLP material, and then forming the pits.

7. The process of claim 2, comprising sequentially first forming the pits, and then depositing the TLP material, wherein a final diameter of each pit including the TLP material is 20 to 100 microns.

8. The process of claim 2, comprising forming the pits, and then depositing the TLP material only within the pits.

9. The process of claim 1, further comprising, before depositing the skin, forming grooves in the outer surface of the core structure, filling the grooves with a fugitive filler, and, after depositing the skin, removing the fugitive filler to form subsurface cooling channels under and adjacent to the skin.

10. The process of claim 9, wherein the component is a turbine engine airfoil.

11. The process of claim 1, further comprising
   forming the pits by laser drilling that forms an ejecta ring surrounding each pit, not removing the ejecta rings, and depositing the skin over the ejecta rings.

12. A process for fabricating a turbine component, comprising:
   casting a component core structure;
   forming grooves in an outer surface of the core structure;
   filling the grooves with a fugitive filler material;
   forming pits with an average pit diameter of 20 to 100 microns in the outer surface of the core structure between the grooves;
   depositing a transient liquid phase (TLP) material comprising a melting-point depressant on the outer surface of the core structure;
   depositing a skin on the outer surface of the core structure over the TLP material, thereby forming an assembly;
   heating the assembly, forming a diffusion bond interface between the skin and the core structure and diffusing the melting-point depressant away from the diffusion bond interface; and
   removing the fugitive filler material, forming subsurface cooling channels under and adjacent to the skin.

13. The process of claim 12, comprising forming the pits with an average pit depth of 1.5 to 4 times the average pit diameter, and an average pit separation distance on at least a portion of the outer surface of the core structure of 1 to 5 times the average pit diameter.

14. The process of claim 13, comprising depositing the transient liquid phase (TLP) material on the outer surface of the core structure using a thin film deposition process, then thermally spraying the skin over at least said portion of the outer surface of the core structure and over the TLP material.

* * * * *